Fig. 3

INVENTORS
WILLIAM R. LONG,
ZEBULON V. LONG &
PHILIP J.T. RAWLINS

BY

ATTORNEYS

Fig. 4

INVENTORS
WILLIAM R. LONG,
ZEBULON V. LONG &
PHILIP J.T. RAWLINS
BY
ATTORNEY

United States Patent Office 3,530,652
Patented Sept. 29, 1970

3,530,652
COTTON HARVESTER WITH MEANS FOR SEPARATING MATURE COTTON FROM GREEN BOLLS AND DEBRIS
William R. Long, Zebulon Vance Long, and Philip J. T. Rawlins, Tarboro, N.C., assignors to Long Manufacturing Company, Tarboro, N.C.
Filed Sept. 2, 1966, Ser. No. 576,874
Int. Cl. A01d *45/18*
U.S. Cl. 56—12                                6 Claims

ABSTRACT OF THE DISCLOSURE

A mobile harvester for cotton having a housing with means for introducing cotton thereinto, and for conveying the cotton by both pneumatic and mechanical means through the housing in a predetermined path of travel, and for cushioning and separating the cotton and foreign matter, allowing the heavier particles to fall by gravity upon being halted by such cushioning means, and the lighter particles to be conveyed, cleaned and deposited in a collection area.

---

This invention relates to a harvester for harvesting cotton or other products and comprises a mobile unit with mechanism for stripping the cotton or other product from the stalk on which grown, moving it through cleaning mechanism, and depositing it in a carried receptacle, hopper, or basket, for subsequent discharge. The harvester includes mechanism by which it may be propelled, as well as mechanism for driving the various elements, including the harvesting, cleaning and conveying portions of the harvester.

Heretofore cotton has been picked by hand at progressively greater expense as time has passed with efforts made to replace hand labor with mechanical means. Prior devices not only have been expensive and complicated, but did not perform satisfactorily and resulted in cotton not being clean but containing trash, such as leaves, twigs, boll fragments and the like, reducing the quality and making it necessary that additional cleaning be done at the gin, all of which contributed to increase in the cost of production of the cotton and rendered the production less profitable.

It is an object of the invention to provide a mechanical harvester for use in the harvesting of cotton and other products, which harvester is of relatively simple, practical, economical, and efficient construction, which will greatly reduce the cost of harvesting, will yield a greater amount of cotton or other product in proportion to the weight of the total material harvested, and will result in a cleaner higher grade product.

Another object of the invention is to provide a cotton harvester having more practical, more efficient, cleaning and conveying mechanisms, and including means by which the cotton is stripped from the stalk, moved by augers or other means to a transfer container or box and subjected to three stages of separation including by the combination of:

(1) Mechanical agitation and air velocity;
(2) Gravity on matter suspended in a moving air stream supplemented by a mechanical conveyor; and,
(3) Change in direction of a relatively high velocity air stream and a relatively large cushioning surface to receive the impact of the weightier material tending to continue to travel in a straight line due to its inertia and causing the impact of the heavier particles against the cushion to interrupt their motion sufficiently to permit them to drop out by gravity while the lighter particles are carried along by the air stream around the elbow in the air duct to a receiving area.

Other objects and advantages of the invention will be apparent from the following specification and appended claims when taken in connection with the accompanying drawings in which:

With continued reference to the drawings the harvester of the present invention includes a vehicle 20 having a front guiding wheel 21, preferably with power steering, a pair of driving wheels 22 and 23, and a power plant or motor 24 with suitable transmission. Mounted on each side of the vehicle 20 are spaced pairs of pivotally mounted stripping mechanisms 25 and 26 each like the other. By means of these a cotton stalk can be stripped clean of both the open and closed bolls, by means of rotatable brushes 27 rotating in opposite directions to cause the harvested product to be discharged in opposite directions from the stalk and be deposited in conveyor housings 28 and carried along by augers or screw-type conveyors 29.

The cooperating conveyors include shafts 30 and 30', and auger flights 31 and 32. The shafts 30 and 30' with the auger flights 31 and 32 are generally horizontal disposed with their rear ends slightly closer together or substantially converging. These rear ends are located near the rear of the vehicle and are enclosed in housings 28. The spiral flights of the augers or screws 31 and 32 are spaced from the housings 28 in a manner not to rupture the bolls of cotton conveyed. The conveyors 29 receive the cotton bolls stripped by the brushes 27 and then carried by auger flights 31 and 32 to a transfer receptacle or box 33 which extends across from the outside conveyor to the inside of the conveyor housing containing the augers or screw flights 31 and 32.

The shaft 30 extends into the transfer box 33 while the shaft 30' extends in and beyond the transfer box 33. The auger flight 31 terminates in a straight paddle or agitator 34 in the area of the transfer box 33 to cause the cotton carried by auger flight 31 to be transferred into the path of the auger flight 32, at which point the flight 32 is increased in diameter to compensate for the added material reaching it. Accordingly it will be understood that the cotton is transferred from the outer conveyor to the inner conveyor where it is combined with the cotton of the latter and the combined mass is further conveyed rearwardly to a common discharge hopper or receptacle 33'.

The increased diameter of the flight 32 of the inside conveyor terminates in the area of the discharge hopper 33' into a straight paddle or agitator 36 for causing the cotton to be moved into a common discharge hopper 33'. This common hopper or receptacle receives the product from conveyors located on opposite sides of the machine and along with any foreign matter contained, it is dropped by gravity against a grid 37 composed of slightly spaced rods or other elements which allows dirt and small heavy particles of foreign matter to be discharged from the machine onto the ground while the cotton is engaged by a stream of air drawn through the spaced rods 37 and into the conveyor housing 38, generally rectangular in cross section, and in which the conveyor belt 39 is located having spaced cleats 40 fixed thereto.

The housing 38 accommodates both the air stream and mechanical belt conveyor 39 in inclined side-by-side relation with the air stream uppermost between the top of the cleats or flights 40 and the housing 38 in the area 41. The upper run of the conveyor 39 is provided with an underlying support 42 for maintaining the distance inside of the housing 38 uniform between the conveyor belt cleats or flights 40 and the suction area 41.

In operation air moving upwardly in the inclined housing 38 at a high velocity carries the lighter cotton or other product inside of same and beside and slightly above the mechanical conveyor belt 39. The heavier particles are scooped up from against the grid rods 37 by the cleats or flights 40 of the mechanical conveyor belt 39 and carried thereon. Means is provided for driving the mechanical conveyor belt 39 so that the flights 40 adjacent the air stream travel in the same direction, although the conveyor belt 39 can be caused to travel in the opposite direction and in either case will carry the green bolls and heavier particles upwardly and deposit them in the green boll hopper 35, while the air stream conveying means travels in the same direction at all times. The velocity of the air stream is such that certain of the heavier particles are carried by it with sufficient forward inertia forceably to come in contact with and strike a cushioning member 43, thus the forward movement of such heavier particles is interrupted momentarily and such heavier particles will drop by gravity into the green boll hopper 35 while the lighter particles are carried upwardly around and through the housing 38 without necessarily striking the cushion 43.

A spreading action of the green bolls in the hopper 35 is accomplished by a levelling auger 44 having left and right flights 45 and 46 extending from the center to the side walls of the hopper 35. Emptying the green boll hopper 35 may be accomplished by means of double doors 47 and 48 mounted on loosely fitted hinges 49 and 50 which permit secondary air to pass through such hinges. The doors 47 and 48 have control arms 51 and 52 operable by means of an over center control locking linkage 53. The doors may be closed with the aid of springs 54 mounted on rods 55, such rods being pivotally connected by a boss 56 to the housing 38 while the opposite end of the rods is slidably attached to a bracket 57. The spring 54 is confined between such bracket and a shoulder or stop 58 on the rod 55.

An air regulating valve opening 59 is provided in the rear wall of the hopper 35 to allow additional secondary air to be drawn in and combined with the primary air passing upwardly through the housing 38 as such air enters the reverse bend area 60 in housing 38 prior to entering the fan housing 61. The valve opening 59 may have an adjusting control 62 for varying the amount of air admitted. Primary air drawn into the lower end of the conveyor housing 38 picks up the harvested cotton or other product and carries it along with the mechanical conveyor belt 39 while the heavier green bolls and foreign matter are dropped by gravity into the green boll hopper 35, thus the first stage of green boll separation is accomplished.

As the cotton is carried upwardly by the air stream within the housing 38 between the conveyor flights and the top of the housing, some of the green bolls and heavier objects that were picked up by the air stream will fall by gravity onto the conveyor belt 39 and be carried to the hopper 35 by the flights 40 and dumped therein, thus completing the second stage of green boll separation.

Since at the upper end of the conveyor belt 39 the housing 38 is reversely bent at 60 to produce a change in the direction of travel of air, the particles of appreciable weight tend to travel in a straight line and strike the flexible, preferably air-tight cushion member or sheet 43 normally sucked inwardly by the air. The cushion 43 is located in such a manner as to be forceably engaged by the heavier particles normally moving in a straight line so that their motion is interrupted suddenly permitting them to drop into the hopper 35 while the lighter particles are carried by the air around the bend 60 in the housing 38 and to the fan housing 61. The fan housing 61 has a screen 63 overlying the fan blades 64 for preventing the cotton from being drawn into contact with the fan thus preventing any damage to the cotton or its seed by the blades. The fan blades 64 are mounted on a shaft 65 supported by bearings independent of the fan housing as to be described later.

The third stage of separation occurs with the change of direction in the housing 38 where the heavier particles continue in a straight line and strike the cushion 43 and drop by gravity into hopper 35. The screen 63 contacted by the cotton is mounted by means of screws 66 to a series of right angle lugs 67 fastened to the face of fan blades 64. In order to break up any sticks or other foreign matter which might enter the fan housing and interfere or clog the operation of the fan there are provided bolts and studs 66' projecting outwardly from the face of the screen 63 and at 180° apart.

Figure 1:
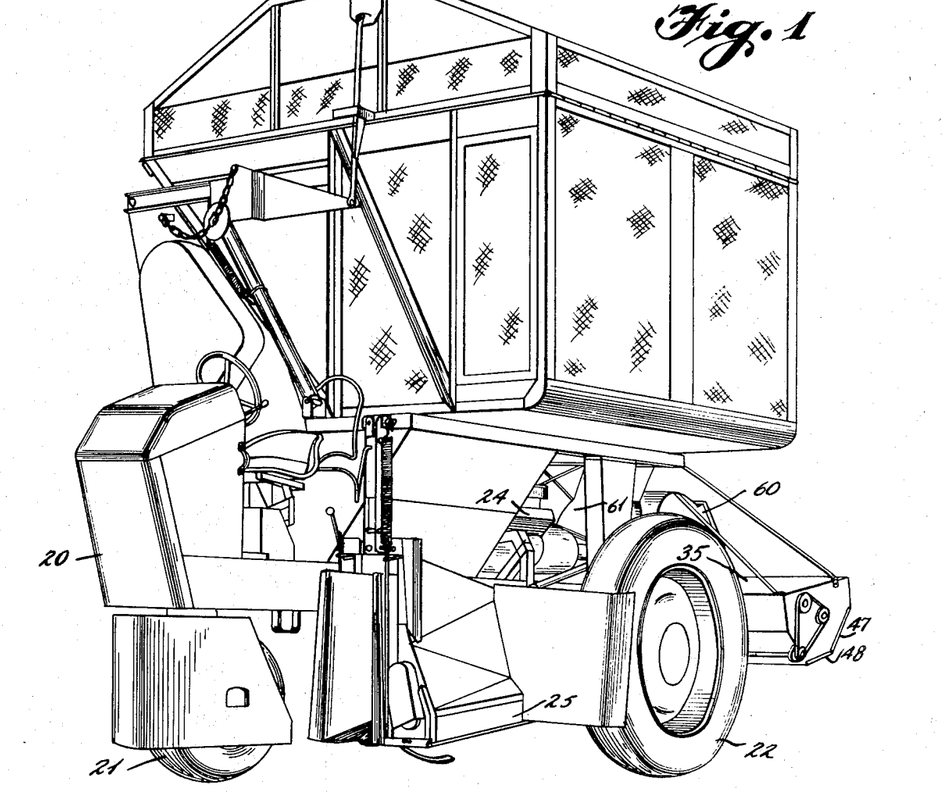
FIG. 1 is a perspective of the front and left side of a low profile self-propelled harvester.
Figure 2:
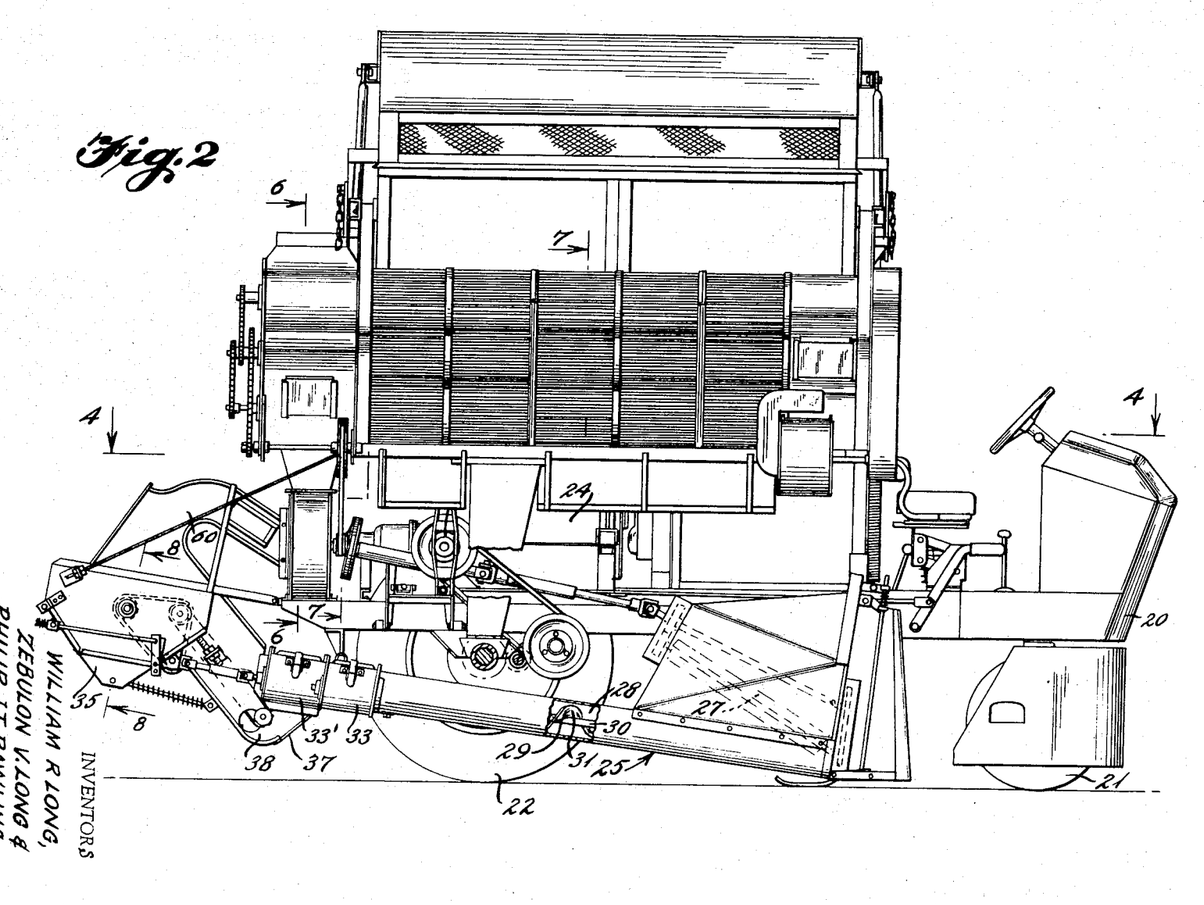
FIG. 2 is a side elevation thereof.
Figure 3:
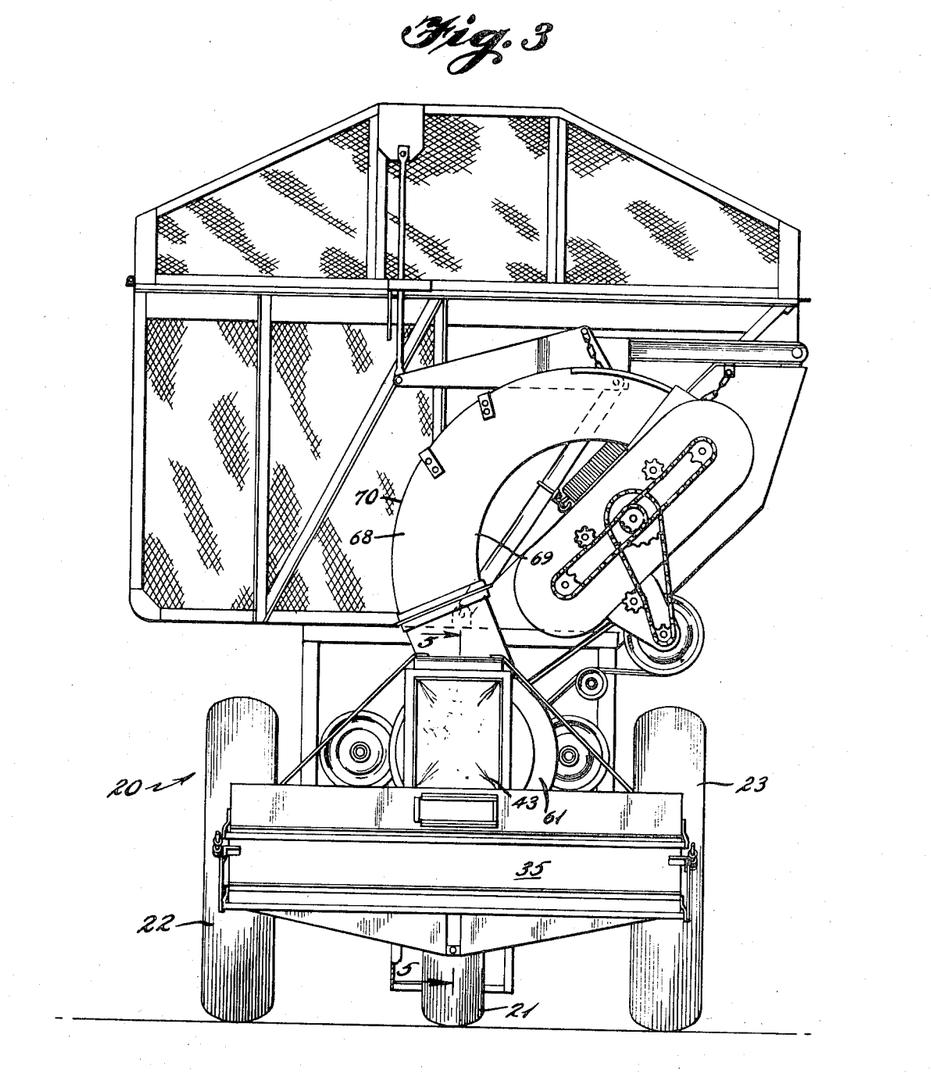
FIG. 3 is a rear elevation thereof.
Figure 4:
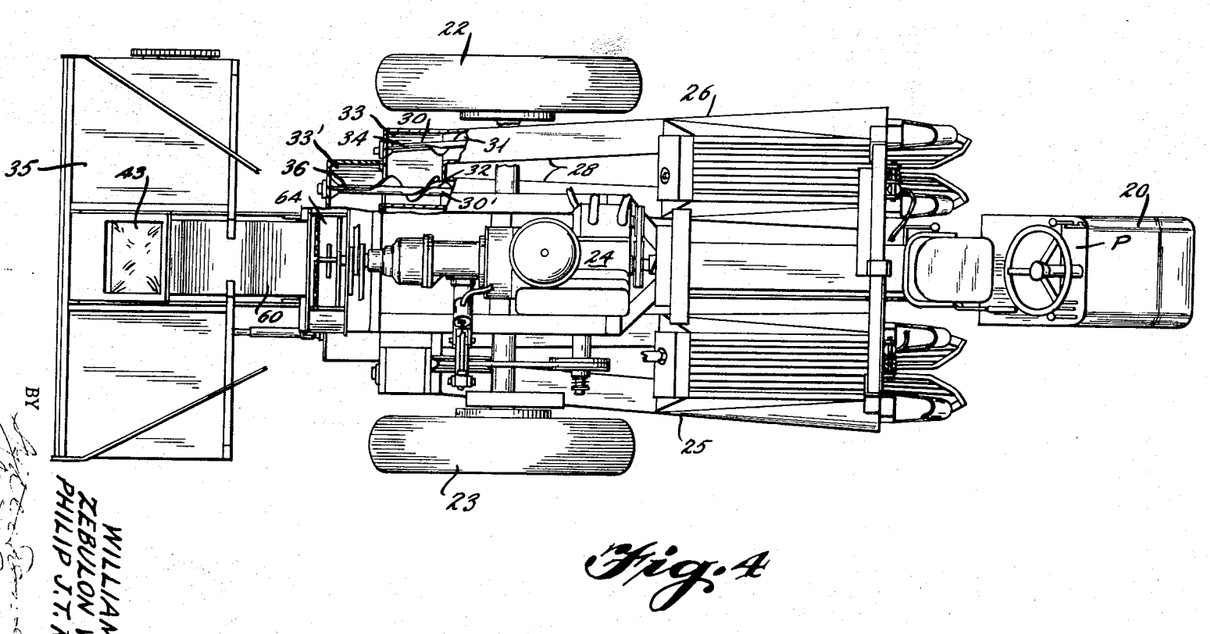
FIG. 4 is a horizontal section on the line 4—4 of FIG. 2.
Figure 5:
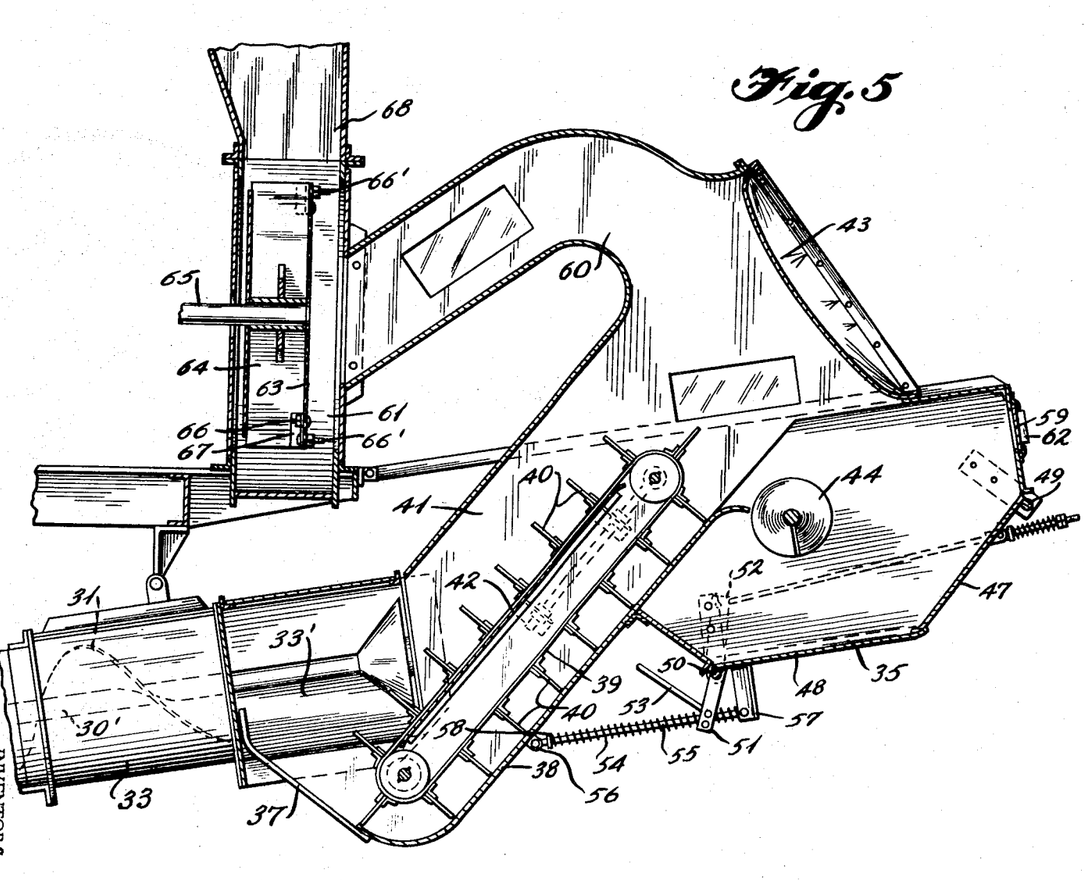
FIG. 5 is an enlarged vertical section on the line 5—5 of FIG. 3 revealing the cooperative multiple elevating and conveying mechanisms.
Figure 6:
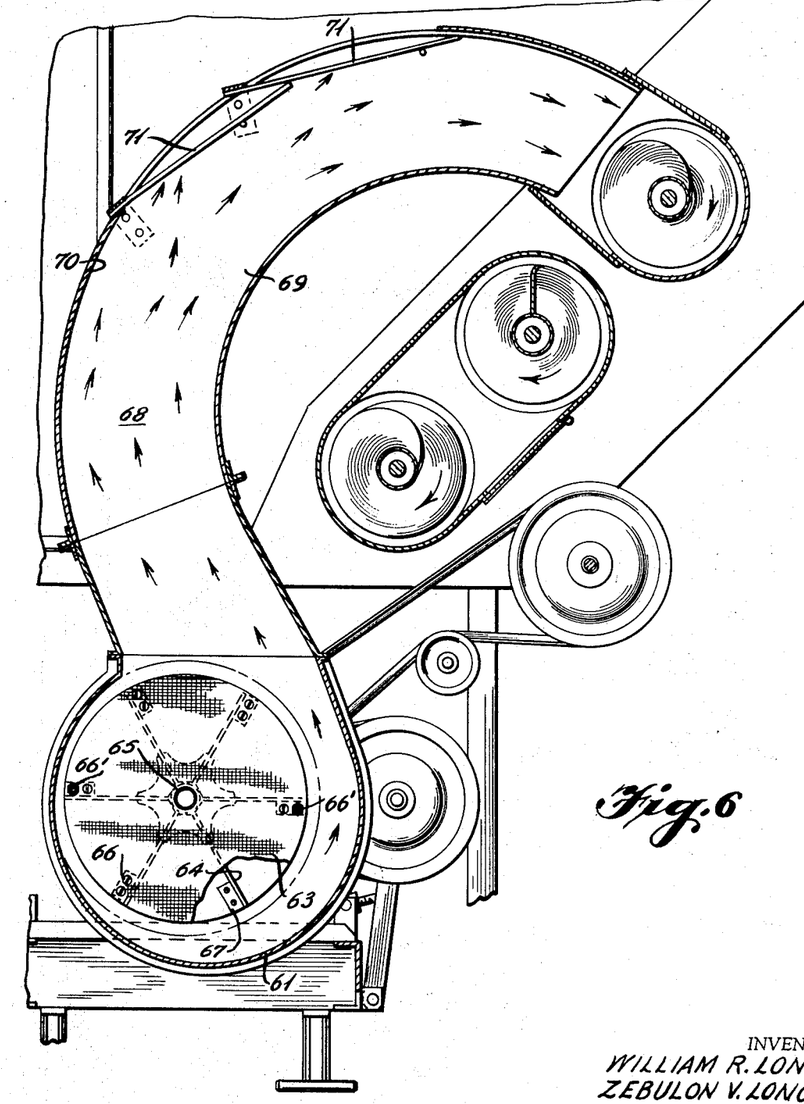
FIGS. 6 and 7 are enlarged vertical sections respectively on the lines 6—6, 7—7, of FIG. 2.
Figure 7:
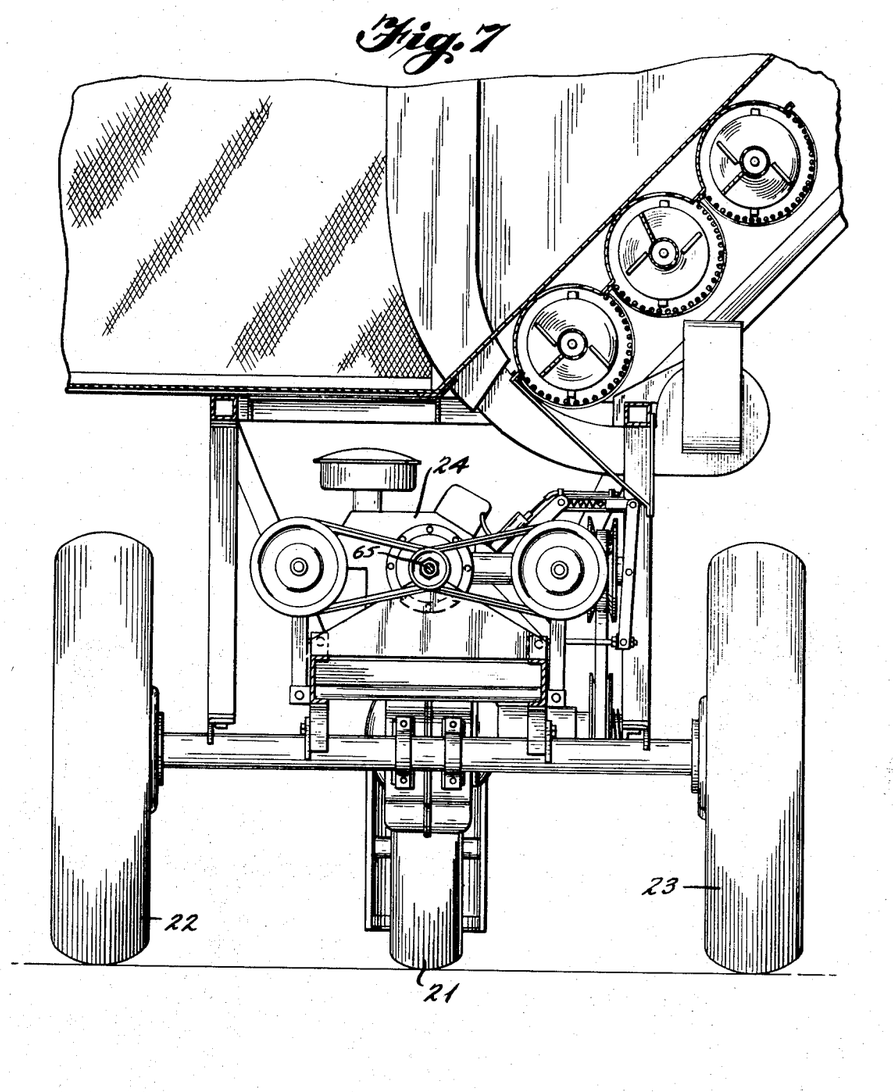
Figure 8:
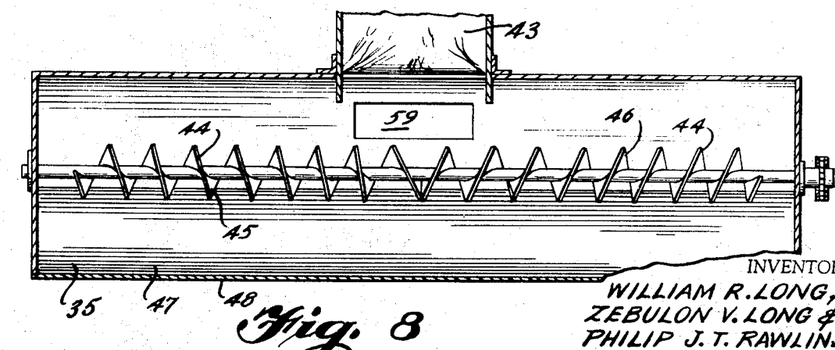
FIG. 8 is an enlarged substantially vertical section on the line 8—8 through the green boll hopper of FIG. 2.
Figure 9:
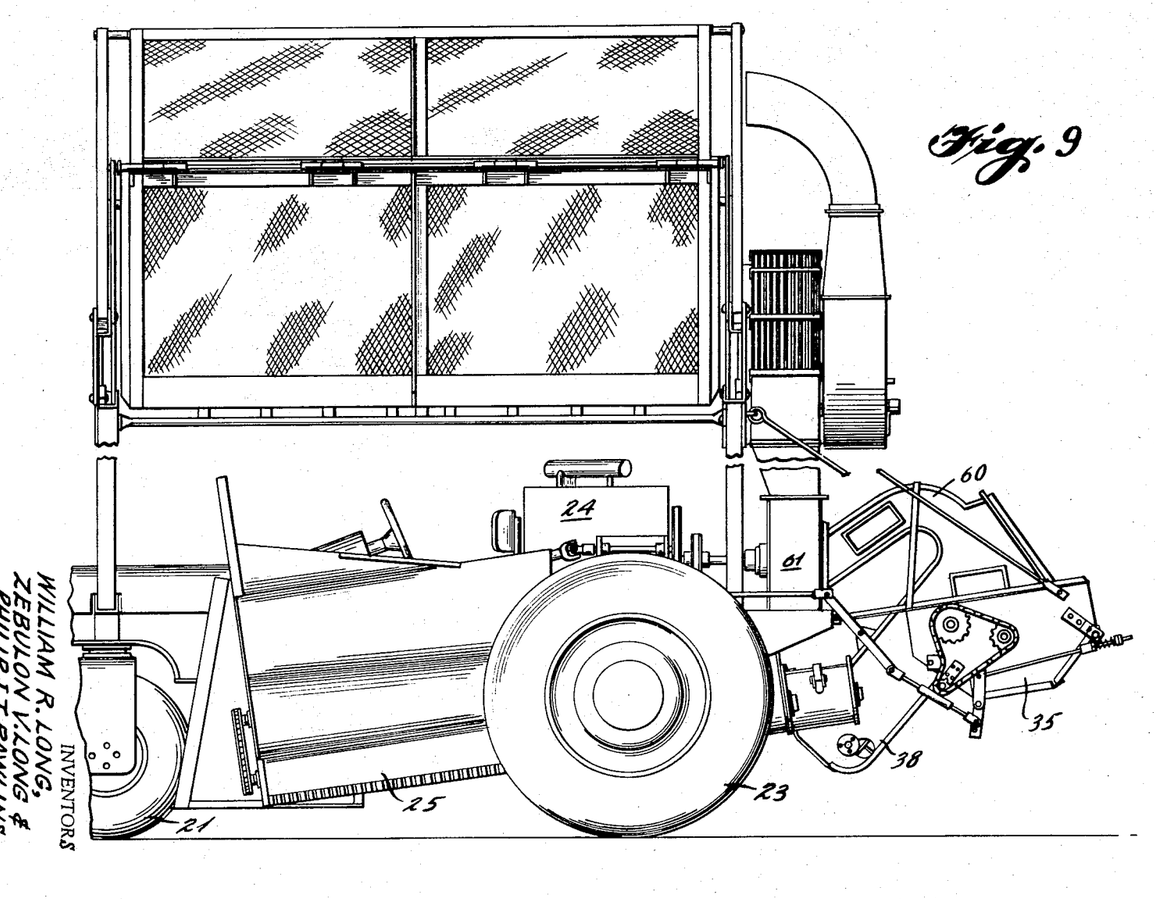
FIG. 9 is a side elevation of a high profile machine.

From the screen face 63 of the fan housing 61 the cotton is discharged by centrifugal force into an air stream moving through an air duct 68 having a curved portion 69 with an outwardly curved edge 70 provided with spaced rods 71 (FIG. 6) to permit the high velocity discharge of dirt and finer particles, such as twigs, leaves and fragments of the bolls and other foreign matter. The action of centrifugal force not only discharges the cotton into the air duct 68, but assists in the separation.

Figure 10:
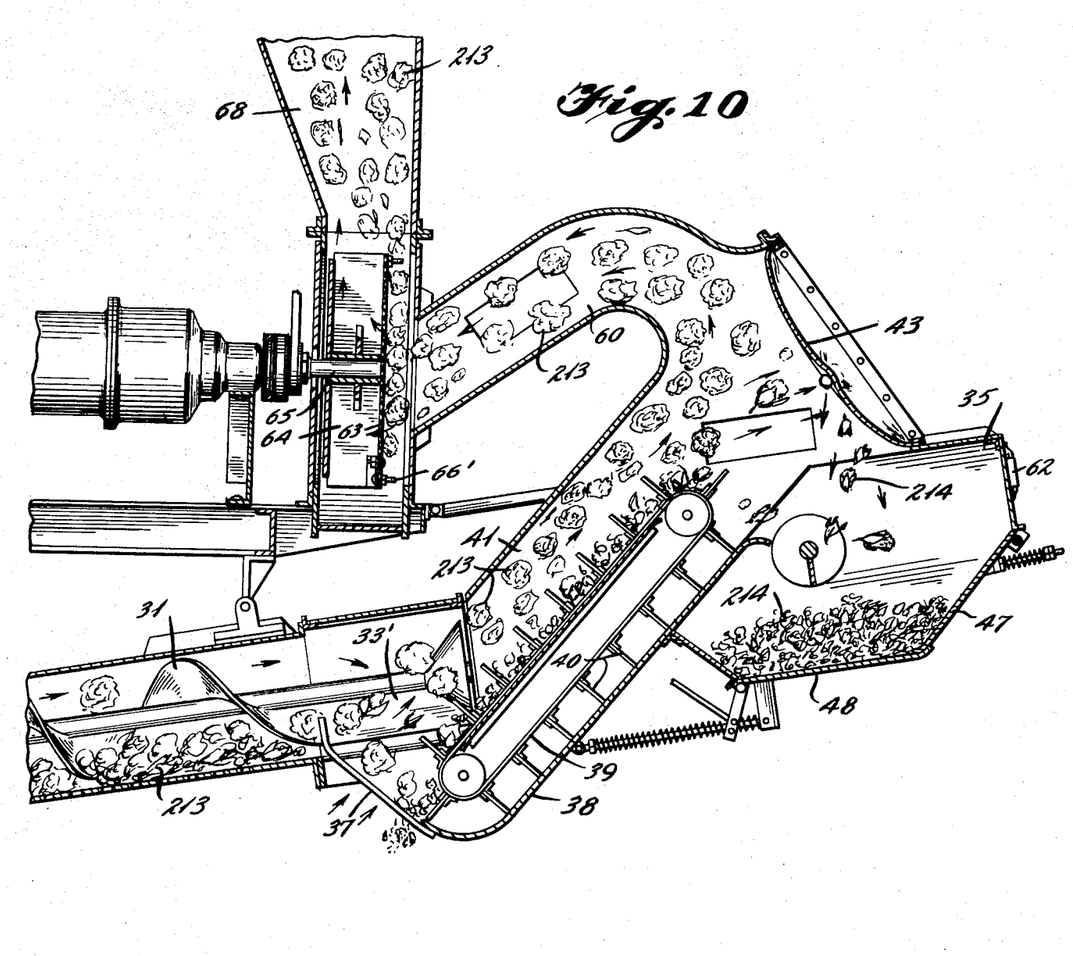
FIG. 10 is an enlarged fragmentary vertical section similar to that of FIG. 5 illustrating the operation of the machine and the path of travel of the cotton and the suspension of same, and in which the trash and green bolls are dropped on the conveyor and carried upwardly, with the cushioning mechanism against which the heavier particles carried in the air stream are projected and separated and collected in a hopper.

FIG. 10 is an enlarged vertical section through the conveyor housing 38 illustrating the path of movement of the cotton 213 by an air stream in the space 41 within housing 38 and also shows the green bolls 214 and trash being carried upwardly on belt 39 pushed by cleats or flights 40. The green bolls and trash on the belt 39 will be dumped into the green boll hopper 35 as will the green bolls that were carried by the air flow with the cotton 213. The cotton carried by the air stream will travel and reverse its direction of flow 60 while the green bolls 214 are carried forward and strike the cushioning member 43 causing them to drop into the hopper 35. The hopper is dumped at one end of the field to allow the green bolls to dry and to be collected at a later time.

What is claimed is:

1. In a mobile cotton harvester, means adapted to separate mature cotton from green bolls and debris; comprising a housing, means operatively associated with said housing for harvesting and introducing cotton thereinto, conveyor means within said housing for conveying the harvested material in an initial predetermined path of travel therethrough, said conveyor means including both mechanical and pneumatic means, cushioning means in said housing aligned with said path of travel in such a position as to be engaged by at least a portion of the harvested material being moved by said conveyor means with the heavier particles permitted to fall by the action of gravity due to their movement being halted by said cushioning means and with the air entrained mature cotton adapted to continue through said housing.

2. The structure of claim 1 in which said housing includes a bend causing a change in direction and in which said cushioning means is located in the area of said bend.

3. The structure of claim 1 and means connected to said housing for further cleaning the cotton after movement from said housing.

4. The structure of claim 1 and said housing having means at the lower portion thereof for admitting air into the lower end of said housing and permitting dirt and small particles of trash to gravitate therefrom.

5. The structure of claim 1 in which the mechanical conveyor is located in the lower portion of the housing for conveying green bolls and objects heavier than the cotton.

6. A harvester as set forth in claim 1 in which the housing is inclined and has an inlet into its lower portion and a first outlet from its upper portion for the heavier particles and located substantially directly beneath said cushioning means, and a second outlet for the material conveyed which is higher than the said first outlet and in which the mechanical conveyor is located along the lower side of said inclined portion and spaced substantially from the opposite side to allow passage of lighter particles therealong.

References Cited

UNITED STATES PATENTS

| | | | |
|---|---|---|---|
| 661,166 | 11/1900 | Boyd | 19—65 |
| 2,049,640 | 8/1936 | Conrad | 19—36 |
| 2,499,037 | 2/1950 | Roles | 209—136 |
| 2,707,364 | 5/1955 | Wagnon | 56—30 |
| 2,777,167 | 1/1957 | Knoth | 19—72 |
| 2,825,197 | 3/1958 | Smith | 56—33 |
| 2,831,565 | 4/1958 | Hensley | 56—30 XR |
| 2,834,175 | 5/1958 | Knowles | 56—33 |
| 3,035,312 | 5/1962 | Cox | 56—12 XR |
| 3,312,343 | 4/1967 | Elder et al. | 209—139 |

FOREIGN PATENTS 617,271  2/1961  Italy.

RUSSELL R. KINSEY, Primary Examiner

U.S. Cl. X.R.

209—137